W. T. RUTH.
SNOW PLOW.
APPLICATION FILED MAR. 4, 1916.

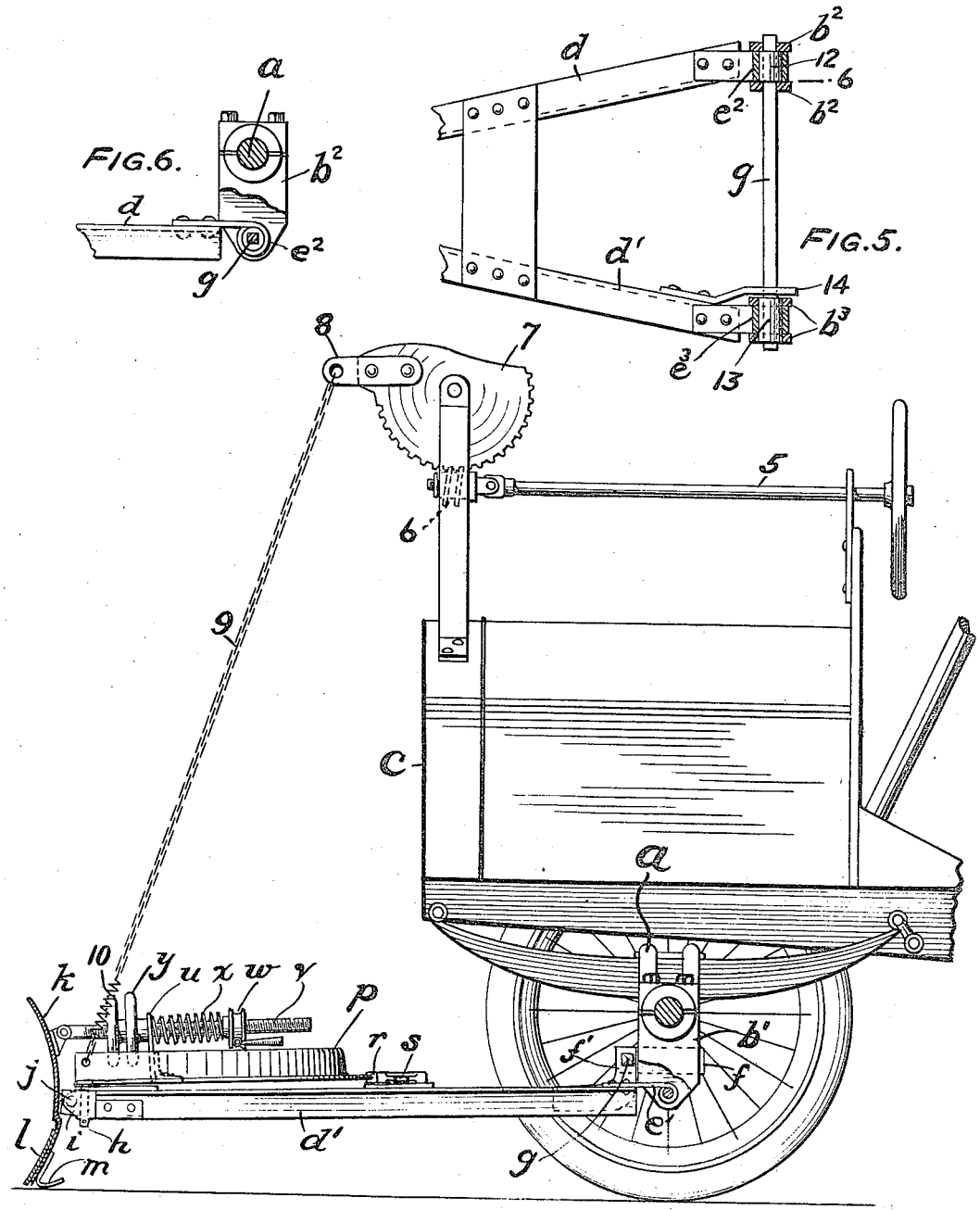

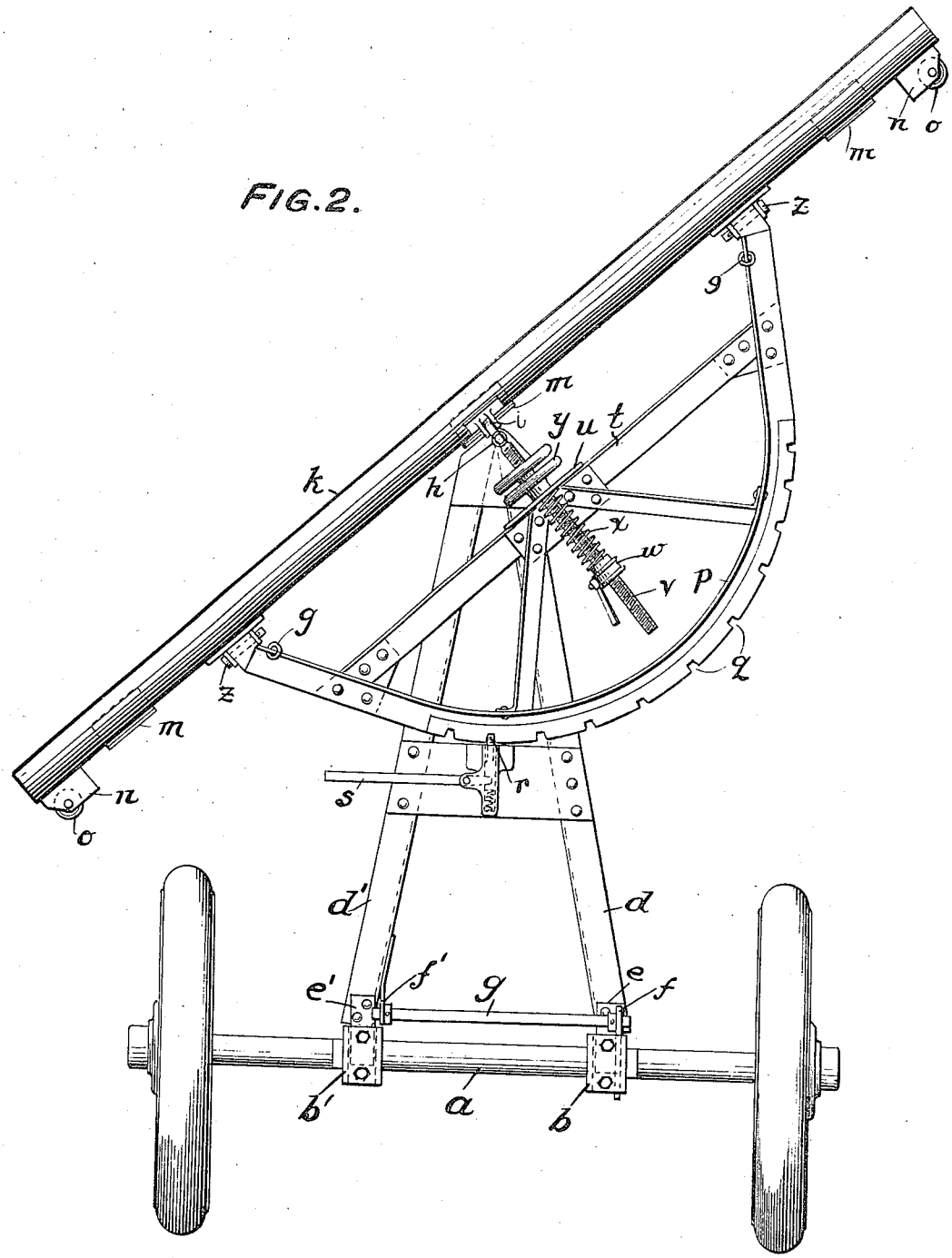

1,195,271. Patented Aug. 22, 1916.
3 SHEETS—SHEET 3.

WITNESS:
Rob R Kitchel.

INVENTOR
William T. Ruth
BY
Frank S. Busser
ATTORNEY.

UNITED STATES PATENT OFFICE.

WILLIAM T. RUTH, OF KENNETT SQUARE, PENNSYLVANIA, ASSIGNOR TO AMERICAN ROAD MACHINERY COMPANY, INC., OF KENNETT SQUARE, PENNSYLVANIA, A CORPORATION OF DELAWARE.

SNOW-PLOW.

1,195,271. Specification of Letters Patent. Patented Aug. 22, 1916.

Application filed March 4, 1916. Serial No. 82,024.

*To all whom it may concern:*

Be it known that I, WILLIAM T. RUTH, a citizen of the United States, residing at Kennett Square, county of Chester and State of Pennsylvania, have invented a new and useful Improvement in Snow-Plows, of which the following is a full, clear, and exact description, reference being had to the accompanying drawings, which form a part of this specification.

The object of my invention is to provide a plow for removing snow or loose material from highways, which may be adjusted to any angle and to different heights and particularly to provide an automatic blade release so constructed that when the cutting edge strikes an obstacle the scraper blade will release to pass over the obstruction and then immediately return to its operating position.

A preferred embodiment of the invention is shown in the accompanying drawings in which—

Figure 4:
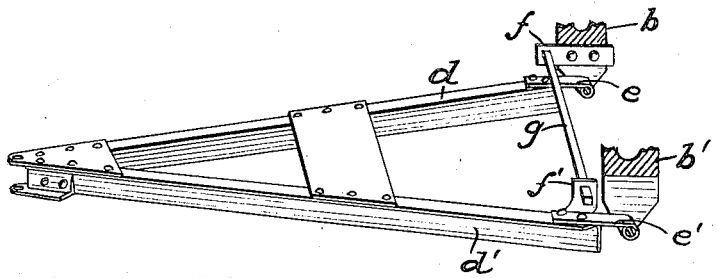
Figure 3:
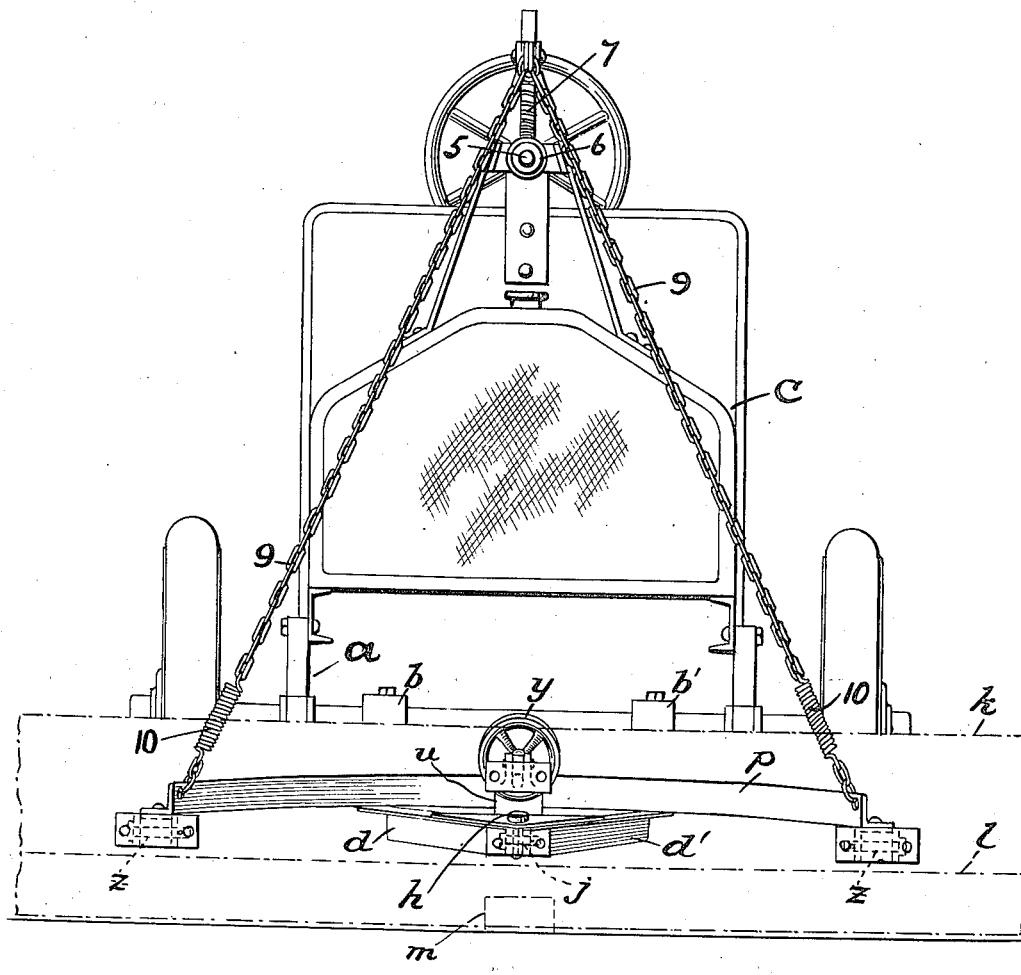

Figure 1 is a side elevation of my improvement mounted on a vehicle body and adjusted for use. Fig. 2 is a plan view of the same. Fig. 3 is a front view of the same with the scraper (shown in dotted lines) adjusted to a central position. Fig. 4 is a perspective view of the scraper supporting frame showing also the means by which it is supported upon the truck. Fig. 5 is a partial plan view showing a modified construction. Fig. 6 is a broken section on line 6 of Fig. 5.

Upon the truck $a$ is spring-supported the vehicle body $c$. Depending from the truck $a$ are brackets $b$, $b'$. Secured to the rear ends of the arms $d$, $d'$ of the V-shaped scraper bar supporting frame are plates $e$, $e'$, pivoted on the brackets $b$, $b'$. Bracket $b$ and arm $d'$ have secured thereto plates $f$ and $f'$ respectively. Inserted in square holes in these plates are the opposite ends of a bar $g$ of spring steel which is square in cross-section to fit the holes.

The front end of the frame $d$, $d'$ carries the scraper bar in a manner hereinafter described. It is preferred to mount the frame upon the truck in a position somewhat inclined to the horizontal, that is, with the front raised somewhat above its normal height. The weight of the frame and attached scraper bar will cause it to drop to or below its normal position, the spring bar $g$ twisting somewhat to allow this drop. The tendency of the spring bar is therefore to raise the scraper frame on its hinged connections. It will therefore be understood that any force tending to lift the scraper will not be obstructed, but, on the contrary, will be aided by the spring bar, and also that the scraper may be raised by manual power, without the necessity of lifting the entire dead weight of the same. At the front of the frame the scraper bar is pivoted so as to be capable of swinging on a horizontal axis and also of being angularly adjusted on a vertical axis. Any suitable pivotal support may be provided. I have shown the front end of the frame $d$, $d'$ provided with a vertical pin $h$ affording a bearing for a swinging block $i$ which is pivoted on a horizontal pin $j$ carried by the scraper bar $k$. The scraper bar is curved from top to bottom, the concave side of the bar facing forwardly. Preferably the lower part of the bar is offset to allow of the application of a plate $l$, which constitutes the scraper blade proper and is removable. The blade $l$ is protected from digging into the ground by shoes $m$ secured to the bar adjacent to its lower rear edge.

Secured to opposite ends of the scraper bar $k$ are brackets $n$ carrying rollers $o$, one or the other of which, dependent upon the adjustment of the scraper bar on its vertical axis, is in position to strike the curb and prevent the adjacent end of the scraper bar from contacting with the same.

A frame $p$ in the shape of a semi-ring or semi-circle is pivoted at its opposite ends to the scraper bar, on horizontal pins $z$, in alinement with pin $j$ in swinging block $i$. The rear convex edge of the semi-ring is provided with notches $q$, any of which is adapted to be engaged by a spring-pressed latch $r$, which is manually released by means of a pivoted lever $s$. Thereby the scraper blade may be adjusted to any desired angle and held in the adjusted position.

Extending across the frame $p$ and uniting opposite end portions of the semi-ring is a bar $t$, to which is secured a bracket $u$ through which extends a screw shaft $v$. The front end of the screw shaft is pivoted to the scraper bar, midway between its ends and relatively near its upper edge, on a horizontal axis. An adjustable nut $w$ is threaded on the shaft $v$ behind the bracket $u$, and between this bracket and nut is confined a compression spring $x$. In front of and contacting with the bracket $u$, an adjusting nut $y$ is threaded on the shaft $v$. The nut $y$ is adjusted to swing the scraper bar on its horizontal supporting axis so that the scraper blade presents the desired angle to the ground. The nut $w$ is adjusted to give the desired tension to the spring $x$. The engagement of the nut $y$ with bracket $u$ acts as an abutment to limit the swing of the scraper bar in the direction to move its working edge forward.

If the scraper bar meets an obstruction its lower edge will be pushed back and its upper edge moved forward, thereby pulling on the shaft $v$ and compressing the spring $x$. At the same time the scraper bar and its supporting frame can swing up vertically on its rear support. As soon as the obstacle has been cleared, the scraper bar frame drops of its own weight and the spring $x$ restores the scraper bar to its normal angle.

Mounted on the vehicle body $c$ is a manually turnable shaft 5 having a worm 6 engaging a worm wheel 7. Secured to the worm wheel is a bracket 8 connected by chains 9, 9, to opposite ends of the semi-ring $p$. Thereby the scraper bar frame is held from dropping below a certain level. It is obvious that by turning the shaft 5, the scraper bar frame may be raised or lowered. Springs 10 are interposed in the chain 9 to allow of some variation in their lengths, as is made necessary by the turning of the scraper blade.

In some form of trucks the use of the spring bar $g$ in the location above described is not practicable, in that to clear the mechanism of the truck, it has to be placed so low that the depending brackets $b$, $b'$ do not have sufficient clearance above the ground.

In order to overcome this difficulty, I have shown in Figs. 5 and 6 a means of pivotally supporting the scraper frame from the supporting means in which the spring bar $g$ is made coincident with the swiveling supports of the scraper frame. In these figures plates $e^2$, $e^3$ correspond to plates $e$ and $e'$ of Figs. 1–4, while brackets $b^2$ and $b^3$ correspond to brackets $b'$ and $b^2$ of Figs. 1–4.

In order to allow the scraper frame to swing on the square bar $g$ I provide sleeves 12, 13 with square holes to fit the bar, and round exteriors to turn in the plates $e^2$, $e^3$. One of the sleeves 13, is made longer than its enveloping plate $e^3$ and projects also through bracket $b^3$. Therefore at this end the square bar, as well as arm $d'$, swings in bracket $b^3$. At this end also a plate 14, similar to plate $f'$ in the first described construction, projects from the scraper frame, and engages the spring bar on the square, preventing any turning action there between. Thus the square bar at one end is held rigidly from turning in bracket $b^2$ connected with the truck but with the scraper frame swiveled thereon, while at the other end the square bar is free to turn in brackets $b^3$ but is rigidly connected with the scraper frame. The spring in this bar, when subjected to torsion, is made to partially support the load of the scraper frame, as in the former construction.

Having now described my invention what I claim as new and desire to secure by Letters Patent is:

1. In a snow plow, the combination with a vehicle and supporting means thereon, of a scraper bar, a frame supporting the bar and pivotally supported from the supporting means on a horizontal axis, and a laterally extending tension bar one part of which is in fixed relation to the supporting means and another part of which is in fixed relation to said frame.

2. In a snow plow, the combination with a vehicle and supporting means thereon, of a scraper bar, a frame supporting the bar and pivotally supported from the supporting means on a horizontal axis, and a laterally extending tension bar one part of which is in fixed relation to the supporting means and another part of which is in fixed relation to said frame, said tension bar being arranged so as to be free of tension when the front of the scraper bar frame is lifted to a definite height, whereby the fall of the front end of the scraper bar frame due to its weight throws the bar into tension, thereby assisting in the lifting of the scraper bar frame.

3. In a snow plow, the combination with a vehicle and supporting means thereon, of a frame comprising arms diverging rearwardly, the rearward ends of the arms being pivotally supported from said supporting means, a scraper bar carried at the front of the frame, and a tension bar extending between the rear ends of said arms, one end of the bar being in fixed relation to one arm and the other end of the bar being in fixed relation to said supporting means.

4. In a snow plow, the combination with a vehicle and supporting means thereon, of a frame pivotally supported on a horizontal axis from the supporting means, a tension device connected with the supporting means and said frame and tending to swing said scraper upward, a scraper bar arranged to swing on said frame on both a vertical axis and a horizontal axis, a second frame attached to the scraper bar on a horizontal axis, an adjustable tension device mounted on the last named frame and pivotally attached to the scraper bar and adapted to yield to permit the lower edge of the scraper bar to move rearwardly when encountering an obstruction, and coöperating devices on the two frames adapted to operate to lock the second frame and the scraper bar from swinging on a vertical axis away from the position to which they are adjusted.

5. In a snow plow, the combination with supporting means, of a scraper blade, a scraper frame supporting the blade and swingable on a horizontal axis on said supporting means, a tension device extending lengthwise of said axis and connected with the scraper frame and supporting means and tending to lift the frame, and a second tension device connected with the blade and tending to hold the working edge of the blade forward but adapted to yield to permit the blade to swing in the opposite direction.

6. In a snow plow, the combination with a vehicle and supporting means on the axle, of a frame pivotally supported on a horizontal axis from said supporting means, a scraper bar swingable on the frame on both a horizontal axis and a vertical axis, a semi-ring the ends of which are pivotally connected with the scraper bar on a horizontal axis and movable with the scraper bar on the latter's vertical axis, a manually adjustable support on the vehicle, flexible connections between said support and the opposite ends of the semi-ring, and a tension device yieldingly allowing the scraper bar to swing on its horizontal axis when encountering an obstruction.

7. In a snow plow, the combination with a vehicle and supporting means thereon, of a scraper comprising a frame pivotally supported from the supporting means on a horizontal axis and a scraper bar pivotally connected with the frame to swing on both horizontal and vertical axes, a tension device connected with the supporting means and said frame and tending to swing the scraper upward against the latter's weight, and a second tension device connected with the scraper bar and tending to hold the working edge of the blade forward, whereby the scraper is adapted to readily yield both on its pivot and bodily upward.

In testimony of which invention, I have hereunto set my hand, at Philadelphia, Penna., on this 1st day of March, 1916.

WILLIAM T. RUTH.